United States Patent
Jeong et al.

(10) Patent No.: US 9,917,467 B2
(45) Date of Patent: Mar. 13, 2018

(54) WIRELESS POWER RECEPTION DEVICE AND ELECTRONIC DEVICE INCLUDING THE SAME

(71) Applicant: Samsung Electro-Mechanics Co., Ltd., Suwon-Si (KR)

(72) Inventors: In Wha Jeong, Suwon-Si (KR); Hugh Kim, Suwon-Si (KR); Dae Hun Kim, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 296 days.

(21) Appl. No.: 14/695,217

(22) Filed: Apr. 24, 2015

(65) Prior Publication Data
US 2015/0318735 A1    Nov. 5, 2015

(30) Foreign Application Priority Data

Apr. 30, 2014   (KR) .................. 10-2014-0052696
Sep. 11, 2014   (KR) .................. 10-2014-0120459

(51) Int. Cl.
H02J 7/00    (2006.01)
H02J 7/02    (2016.01)
H02J 5/00    (2016.01)
H02J 17/00   (2006.01)

(52) U.S. Cl.
CPC ............. *H02J 7/025* (2013.01); *H02J 5/005* (2013.01); *H02J 17/00* (2013.01)

(58) Field of Classification Search
CPC ...................................... H02J 7/025
USPC ......................... 320/108; 307/104
See application file for complete search history.

(56) References Cited

U.S. PATENT DOCUMENTS

| | | | | |
|---|---|---|---|---|
| 2008/0290736 A1* | 11/2008 | Onishi | ............... | H02J 7/025 307/107 |
| 2013/0009462 A1* | 1/2013 | Amano | ............... | B60L 5/005 307/9.1 |
| 2013/0009488 A1* | 1/2013 | Choe | ............... | H02J 5/005 307/104 |
| 2013/0043737 A1* | 2/2013 | Yeo | ............... | H02J 17/00 307/104 |

(Continued)

FOREIGN PATENT DOCUMENTS

CN    203398880 U    1/2014
EP    2 546 999 A2    1/2013

(Continued)

OTHER PUBLICATIONS

"A4WP Wireless Power Transfer System Baseline System Specification (BSS)," Alliance for Wireless Power, Ver. 1.1.2+, Nov. 14, 2013 (98 pages, in English).

(Continued)

*Primary Examiner* — Drew A Dunn
*Assistant Examiner* — Zixuan Zhou
(74) *Attorney, Agent, or Firm* — NSIP Law

(57) ABSTRACT

A wireless power reception device includes a first resonant circuit having a first resonant frequency; a second resonant circuit connected in parallel with the first resonant circuit and having a second resonant frequency; and a rectifier configured to receive power received wirelessly by either one or both of the first resonant circuit and the second resonant circuit to output a charging current.

26 Claims, 7 Drawing Sheets

(56) References Cited

U.S. PATENT DOCUMENTS

2013/0200717 A1* 8/2013 Bourilkov .............. H02J 7/025
                                                    307/104
2013/0214612 A1   8/2013 Bae
2014/0225450 A1   8/2014 Endo et al.

FOREIGN PATENT DOCUMENTS

| JP | 2010-119193 A | 5/2010 |
| JP | 2012-34524 A | 2/2012 |
| JP | 2013-172640 A | 9/2013 |
| KR | 10-1118471 B1 | 3/2012 |
| KR | 10-2013-0102218 A | 9/2013 |
| KR | 10-1378118 B1 | 3/2014 |
| WO | WO 2013/057896 A1 | 4/2013 |

OTHER PUBLICATIONS

European Search Report dated Sep. 22, 2015, in counterpart European Application No. 15162770.0 (7 pages, in English).

Chinese Office Action dated Dec. 5, 2016 in corresponding Chinese Patent Application No. 201510217135.8 (26 pages with English translation).

Korean Office Action dated Jan. 29, 2016 in counterpart Korean Application No. 10-2014-0120459 (18 pages in Korean with English translation).

European Search Report dated Feb. 10, 2016 in counterpart European Application No. 15162770.0 (13 pages in English).

* cited by examiner

WIRELESS POWER RECEPTION DEVICE AND ELECTRONIC DEVICE INCLUDING THE SAME

CROSS-REFERENCE TO RELATED APPLICATIONS

This application claims the benefit under 35 USC 119(a) of Korean Patent Application Nos. 10-2014-0052696 filed on Apr. 30, 2014 and 10-2014-0120459 filed on Sep. 11, 2014, in the Korean Intellectual Property Office, the entire disclosures of which are incorporated herein by reference for all purposes.

BACKGROUND

1. Field

This application relates to a wireless power reception device and an electronic device including the same.

2. Description of Related Art

Wireless power transfer technologies have the potential to be extensively applied to a wide range of communications devices, including smartphones and home appliances, and are expected to be applied to the charging of electric vehicles in the future, and as such, the wireless power transfer technologies have a very wide field of utilization.

As types of wireless power transfer technologies, magnetic inductive coupling and magnetic resonant coupling have been developed. Magnetic inductive coupling in compliance with the Wireless Power Consortium (WPC) standard uses a frequency ranging from 110 kHz to 205 kHz, while magnetic resonance coupling in compliance with the Alliance for Wireless Power (A4WP) standard uses a frequency of 6.78 MHz.

Recently, a scheme in which inductive coupling and magnetic resonance coupling are integrated has also been developed. For example, a technique of performing a magnetic resonance operation in an inductive coupling scheme using a frequency ranging from 110 kHz to 205 kHz to thus realize remote wireless charging has been developed.

However, the use of inductive coupling makes it difficult to perform remote wireless charging, and the use of magnetic resonance coupling leads to relatively complicated circuits, and since a single resonant frequency is fixed, there are limitations on wireless power reception.

In addition, various schemes for wireless power reception using a variety of resonant frequencies have been proposed, but related art techniques use a switch for selecting a resonant frequency, and thus need a control circuit for controlling the switch, making circuits complicated, which may be somewhat technically infeasible.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power reception device includes a first resonant circuit having a first resonant frequency; a second resonant circuit connected in parallel with the first resonant circuit and having a second resonant frequency; and a rectifier configured to rectify power received wirelessly by either one or both of the first resonant circuit and the second resonant circuit to output a charging current.

The first resonant circuit and the second resonant circuit may be directly connected to each other.

The first resonant circuit and the second resonant circuit may be connected to each other without a switch.

The power may be received wirelessly by the first resonant circuit and supplied to the rectifier in response to a frequency of the power being the first resonant frequency due to the second resonant circuit having a high impedance at the first resonant frequency relative to an impedance of the first resonant circuit at the first resonant frequency, and the power may be received wirelessly by the second resonant circuit and supplied to the rectifier in response to the frequency of the power being the second resonant frequency due to the first resonant circuit having a high impedance at the second resonant frequency relative to an impedance of the second resonant circuit at the second resonant frequency.

The first resonant circuit may include a first capacitor; and a first coil connected in series with the first capacitor.

The second resonant circuit may include a second capacitor; and a second coil connected in series with the second capacitor.

The second resonant frequency may be greater than or equal to five times the first resonant frequency.

The first resonant frequency may be a Wireless Power Consortium (WPC) standard frequency or a Power Matters Alliance (PMA) standard frequency, and the second resonant frequency may be an Alliance for Wireless Power (A4WP) standard frequency.

In another general aspect, a wireless power reception device includes a printed circuit board (PCB), and the PCB includes a first region in which a rectifier is disposed; and a second region in which a first coil, a second coil, a first capacitor, and a second capacitor are disposed; wherein one end of the first coil is connected to the rectifier and another end of the first coil is connected to the first capacitor, one end of the first capacitor is connected to the first coil and another end of the first capacitor is connected to the rectifier, one end of the second coil is connected to the rectifier and another end of the second coil is connected to the second capacitor, one end of the second capacitor is connected to the second coil and another end of the second capacitor is connected to the rectifier, and the first coil and the first capacitor connected to each other are connected in parallel with the second coil and the second capacitor connected to each other.

The first capacitor and the second capacitor may be embedded in the second region of the PCB.

The first coil and the second coil may be disposed on a same surface of the second region of the PCB.

The first coil may be disposed inside an inner periphery of the second coil.

The second coil may be disposed outside the first coil.

The first coil may be disposed on one surface of the second region of the PCB, and the second coil may be disposed on another surface of the second region of the PCB.

A second resonant frequency determined by the second coil and the second capacitor may be greater than or equal to five times a first resonant frequency determined by the first coil and the first capacitor.

A first resonant frequency determined by the first coil and the first capacitor may be a Wireless Power Consortium (WPC) standard frequency or a Power Matters Alliance (PMA) standard frequency, and a second resonant frequency determined by the second coil and the second capacitor may be an Alliance for Wireless Power (A4WP) standard frequency.

In another general aspect, a wireless power reception device includes a printed circuit board (PCB), and the PCB includes a first region in which a first capacitor, a second capacitor, and a rectifier are disposed; and a second region in which a first coil and a second coil are disposed; wherein one end of the first coil is connected to the rectifier and another end of the first coil is connected to the first capacitor, one end of the first capacitor is connected to the first coil and another end of the first capacitor is connected to the rectifier, one end of the second coil is connected to the rectifier and another end of the second coil is connected to the second capacitor, one end of the second capacitor is connected to the second coil and another end of the second capacitor is connected to the rectifier, and the first coil and the first capacitor are connected to each other are connected in parallel with the second coil and the second capacitor connected to each other.

The first coil and the second coil may be disposed on a same surface of the PCB.

The first coil may be disposed on one surface of the PCB, and the second coil may be disposed on another surface of the PCB.

A second resonant frequency determined by the second coil and the second capacitor may be greater than or equal to five times a first resonant frequency determined by the first coil and the first capacitor.

A first resonant frequency determined by the first coil and the first capacitor may be a Wireless Power Consortium (WPC) standard frequency or a Power Matters Alliance (PMA) standard frequency, and a second resonant frequency determined by the second coil and the second capacitor may be an Alliance for Wireless Power (A4WP) standard frequency.

In another general aspect, an electronic device includes a first resonant circuit having a first resonant frequency; a second resonant circuit connected in parallel with the first resonant circuit and having a second resonant frequency; a rectifier configured to rectify power received wirelessly by either one or both of the first resonant circuit and the second resonant circuit to output a charging current; and a battery configured to receive the charging current to be charged by the charging current.

The first resonant circuit may include a first capacitor; and a first coil connected in series with the first capacitor.

The second resonant circuit may include a second capacitor; and a second coil connected in series with the second capacitor.

The second resonant frequency may be greater than or equal to five times the first resonant frequency.

The first resonant frequency may be a Wireless Power Consortium (WPC) standard frequency or a Power Matters Alliance (PMA) standard frequency, and the second resonant frequency may be an Alliance for Wireless Power (A4WP) standard frequency.

In another general aspect, a wireless power reception device includes a receiver including a plurality of resonant circuits each having a different resonant frequency, the receiver being configured to automatically activate one of the resonant circuits having a resonant frequency equal to a frequency of power being wirelessly transmitted without using a switch to wirelessly receive the power; and a rectifier configured to rectify the power received by the receiver to output a charging current.

Each of the resonant circuits may include a coil and a capacitor connected in series with each other.

The resonant circuits may be directly connected in parallel with each other without being connected through any switch.

Each of the resonant circuits except the resonant circuit having the resonant frequency equal to the frequency of the power being wirelessly transmitted may have an impedance at the resonant frequency of the power being wirelessly transmitted that is sufficiently high that essentially none of the power being wirelessly transmitted is received by any of the resonant circuits except the resonant circuit having the resonant frequency equal to the frequency of the power being wirelessly transmitted.

Other features and aspects will be apparent from the following detailed description, the drawings, and the claims.

DETAILED DESCRIPTION

Figure 1:
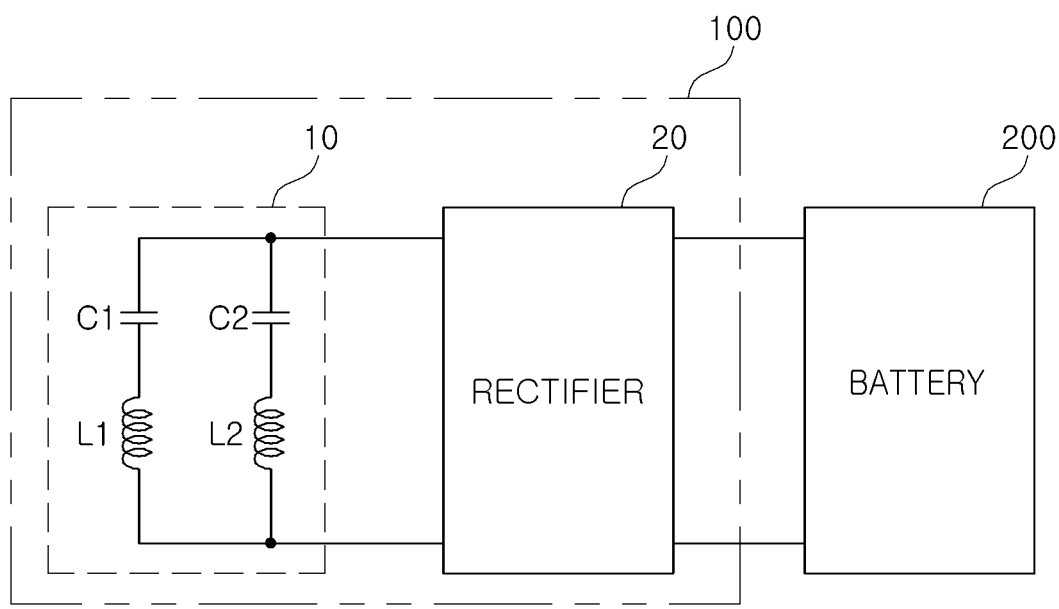
FIG. 1 illustrates an example of an electronic device including a wireless power reception device.

The following detailed description is provided to assist the reader in gaining a comprehensive understanding of the methods, apparatuses, and/or systems described herein. However, various changes, modifications, and equivalents of the methods, apparatuses and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The leftmost digit or digits of a reference numeral identify the figure in which the reference numeral first appears. The drawings may not be to scale, and the relative size, proportions, and depiction of elements in the drawings may be exaggerated for clarity, illustration, and convenience.

FIG. 1 illustrates an example of an electronic device including a wireless power reception device. The electronic device includes a wireless power reception device 100 and a battery 200. The wireless power reception device 100 includes a receiver 10 and a rectifier 20.

Functions of blocks illustrated in FIG. 1 will be described hereinafter.

In the example in FIG. 1, the receiver 10 includes two coils L1 and L2 and two capacitors C1 and C2, and receives power wirelessly transmitted from a transmitter. However, the number of coils and capacitors may be changed. In the example in FIG. 1, the coil L1 and the capacitor C1 are connected in series, and the coil L2 and the capacitor C2 are connected in series. The coil L1 and the capacitor C1 connected in series form a first resonant circuit having a first resonant frequency, and the coil L2 and the capacitor C2 connected in series form a second resonant circuit having a second resonant frequency, which may be different from the first resonant frequency. Thus, the receiver 10 may have the following two different resonant frequencies:

$$fr1 = \frac{1}{2\pi \cdot \sqrt{L1 \cdot C1}}$$

$$fr2 = \frac{1}{2\pi \cdot \sqrt{L2 \cdot C2}}$$

Accordingly, the receiver 10 may wirelessly receive two types of power having two different resonant frequencies transmitted from two different transmitters through two respective resonance operations. The resonant frequencies fr1 and fr2 may satisfy a relational expression of fr1<<fr2.

In FIG. 1, the receiver 10 including the two coils L1 and L2 and the two capacitors C1 and C2 is illustrated by way of example, but the receiver 10 may include three or more coils and three or more capacitors so that the receiver 10 may wirelessly receive three or more types of power having three or more different resonant frequencies from three or more different transmitters through three or more different respective resonance operations.

The rectifier 20 rectifies the power received wirelessly by the receiver 10 to convert the received power into direct current (DC) power. The rectifier 20 may step up or step down a voltage of the DC power depending on the power requirements of a device to be powered by the wireless power reception device 100 according to circumstances.

The battery 200 receives the DC power from the rectifier 20 and stores energy from the DC power.

In one example, the electronic device including the wireless power reception device 100 performs various operations using energy stored in the battery 200. For example, the electronic device may be any of various types of a portable terminal, such as a smartphone, a tablet PC, a notebook computer, or a personal digital assistant (PDA) that may perform various operations such as a voice call, wireless Internet access, and any other operation known to one of ordinary skill in the art that may be performed by a portable terminal.

In another example, the electronic device including the wireless power reception device 100 is a power supply device including the wireless power reception device 100 and the battery 200 that may be charged with power wirelessly transmitted from an external power source, and supply power to an external device.

Figure 2:
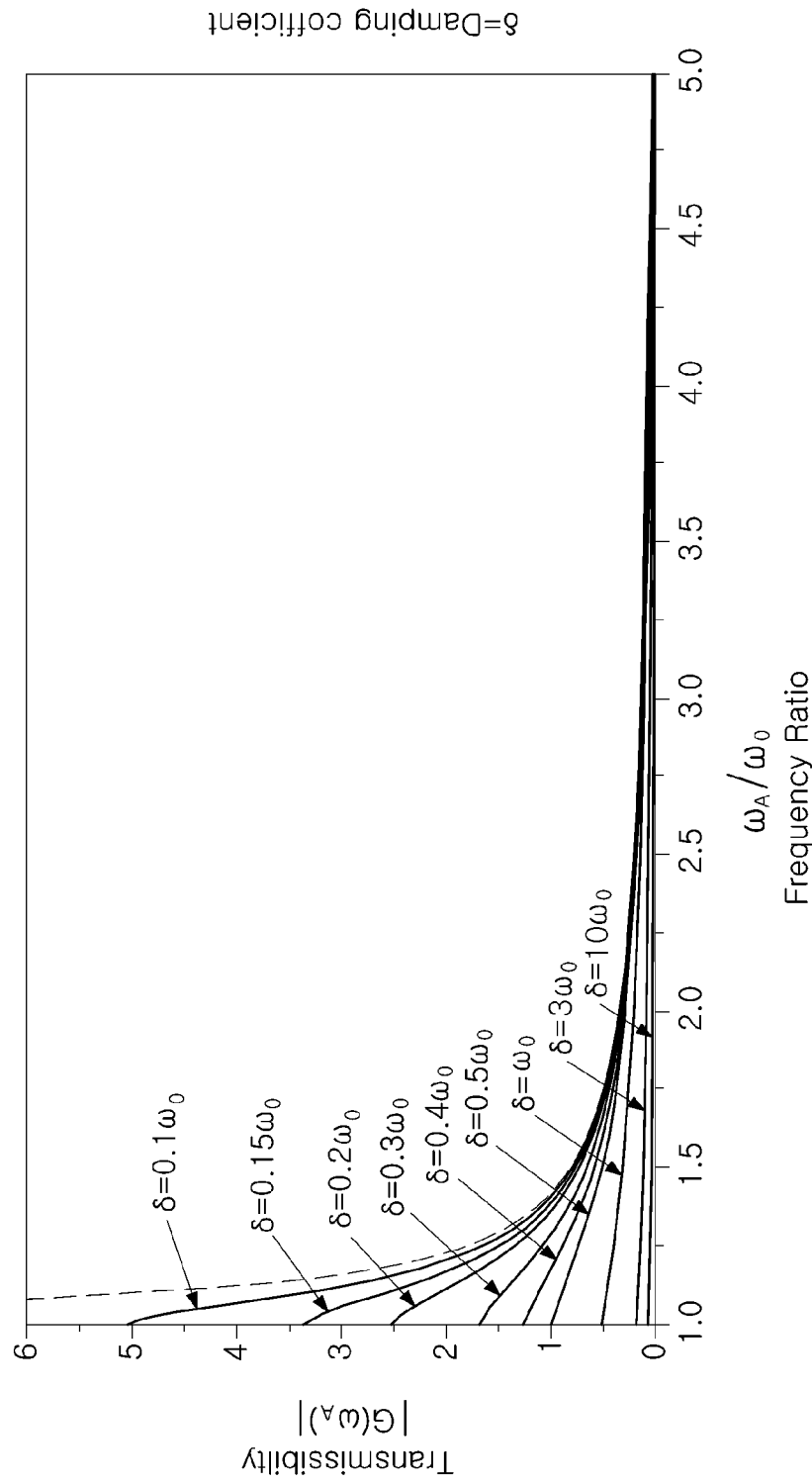
FIG. 2 illustrates an example of a relationship between a first resonant frequency and a second resonant frequency of the wireless power reception device.

FIG. 2 illustrates an example of a relationship between a first resonant frequency and a second resonant frequency of the wireless power reception device 100. FIG. 2 is a graph illustrating an example of a power transmission efficiency in accordance with a ratio between a resonant frequency of the wireless power reception device 100 and a resonant frequency of power to be wirelessly transmitted. In FIG. 2, $\omega_0$ denotes a resonant frequency of the wireless power reception device 100, $\omega_A$ denotes a resonant frequency of the power to be wirelessly transmitted, a transmissibility ($|G(\omega_A)|$) denotes a power transmission efficiency, and $\delta$ denotes a damping coefficient.

As can be seen from FIG. 2, the transmissibility is substantially 0 when $\omega_A/\omega_0$ is about 5, regardless of the damping coefficient $\delta$. Namely, it can be seen that when the resonant frequency $\omega_A$ of the power to be wirelessly transmitted is about five times the resonant frequency $\omega_0$ of the wireless power reception device 100, essentially no power is transmitted to the wireless power reception device 100. In other words, when the second resonant frequency fr2 is about five times the first resonant frequency fr1, there is little coupling or interference between a power transmission coil wirelessly transmitting power having the first resonant frequency fr1 and the second resonant circuit L2 and C2 having the second resonant frequency fr2, and similarly, there is little coupling or interference between a power transmission coil wirelessly transmitting power having the second resonant frequency fr2 and the first resonant circuit L1 and C1 having the first resonant frequency fr1. Thus, the second resonant frequency fr2 may be set to be greater than or equal to five times the first resonant frequency fr1 to avoid the coupling or interference.

In one example, the first resonant frequency fr1 and the second resonant frequency fr2 are resonant frequencies complying with different wireless power transmission standards. For example, the first resonant frequency fr1 may comply with the Wireless Power Consortium (WPC) standard or the Power Matters Alliance (PMA) standard, and the second resonant frequency fr2 may comply with the Alliance for Wireless Power (A4WP) standard. The WPC standard frequency ranges from 110 kHz to 205 kHz, the PMA standard frequency ranges from 277 kHz to 357 kHz, and the A4WP standard frequency is 6.78 MHz. Thus, the wireless power reception device 100 is able to receive power wirelessly according to various standards without controlling a switch to select a resonant frequency.

Figure 3:
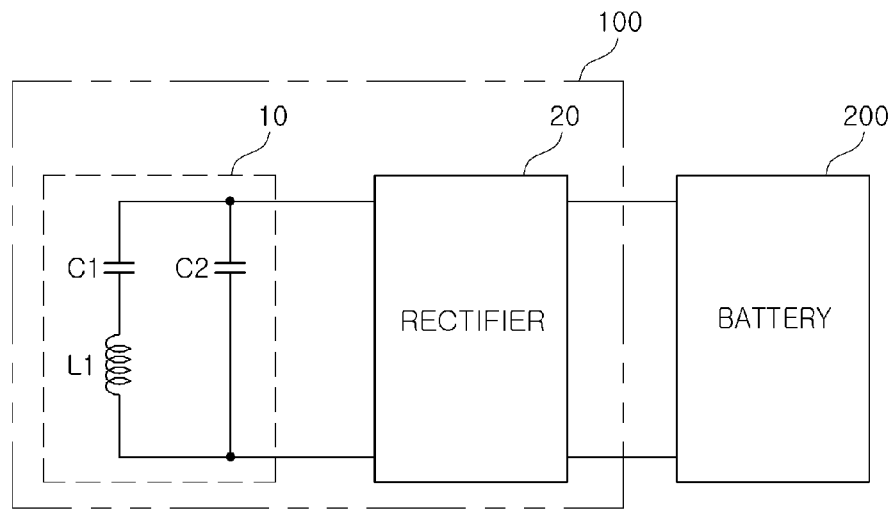
FIG. 3 illustrates an example of an equivalent circuit diagram of the wireless power reception device illustrated in FIG. 1 when power having a first resonant frequency is received wirelessly.

FIG. 3 illustrates an example of an equivalent circuit diagram of the wireless power reception device 100 illustrated in FIG. 1 when power having the first resonant frequency fr1 is received wirelessly.

When the power having the first resonant frequency fr1 is received wirelessly, an operation of the wireless power reception device 100 will be described with reference to FIG. 3.

As described above, $$fr1 = \frac{1}{2\pi \cdot \sqrt{L1 \cdot C1}}, fr2 = \frac{1}{2\pi \cdot \sqrt{L2 \cdot C2}},$$

and fr1<<fr2. When power having the first resonant frequency fr1 is received wirelessly, an impedance ω1·L2 of the second coil L2 (ω1 =2π·fr1) at the first resonant frequency fr1 is low enough to be ignored compared with an impedance $$\frac{1}{\omega 1 \cdot C2}$$

of the second capacitor C2 at the first resonant frequency fr1. Thus, the second coil L2 and the second capacitor C2 of FIG. 1 have an equivalent capacitive characteristic C2 as illustrated in FIG. 3.

Also, when power having the first resonant frequency fr1 is received wirelessly, a combined impedance of the first coil L1 and the first capacitor C1 has a very low value (ideally, 0), and thus the impedance of the second capacitor C2 has a very high value compared to the combined impedance of the first coil L1 and the first capacitor C1. Thus, the second capacitor C2 connected in parallel with the first coil L1 and the first capacitor C1 may be considered to be an open circuit, so that the second capacitor C2 does not affect the resonant circuit of the first coil L1 and the first capacitor C1.

Thus, when the power having the first resonant frequency fr1 is received wirelessly, the receiver 10 of wireless power reception device 100 may be considered to include only the first coil L1 and the first capacitor C1, so that the receiver 10 is able to receive the power having the first resonant frequency fr1 wirelessly through a resonance operation.

Figure 4:
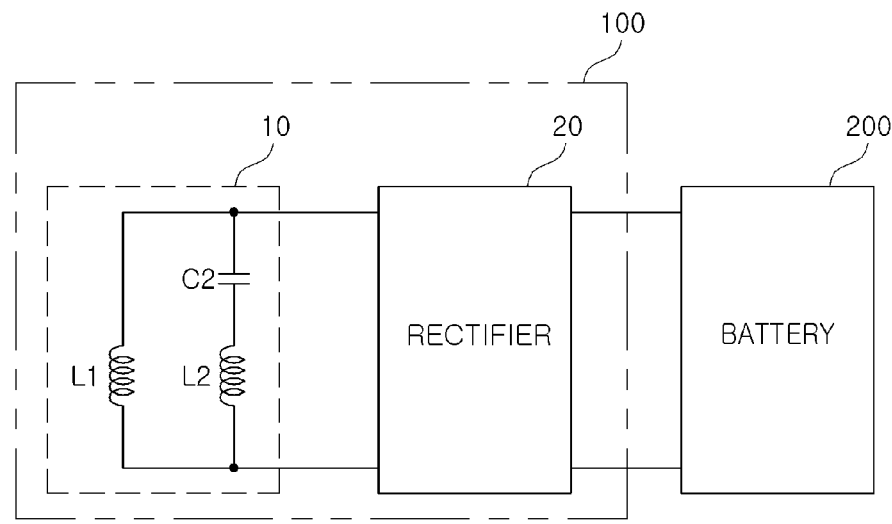
FIG. 4 illustrates an example of an equivalent circuit diagram of the wireless power reception device illustrated in FIG. 1 when power having a second resonant frequency is received wirelessly.

FIG. 4 illustrates an equivalent circuit diagram of the wireless power reception device 100 illustrated in FIG. 1 when power having the second resonant frequency fr2 is received wirelessly.

When the power having the second resonant frequency fr2 is received wirelessly, an operation of the wireless power reception device 100 will be described with reference to FIG. 4.

As described above, $$fr1 = \frac{1}{2\pi \cdot \sqrt{L1 \cdot C1}}, fr2 = \frac{1}{2\pi \cdot \sqrt{L2 \cdot C2}},$$

and fr1<<fr2. When the power having the second resonant frequency fr2 is received wirelessly, an impedance $$\frac{1}{\omega 2 \cdot C1}$$

of the first capacitor C1 (ω2=2π·fr2) at the second resonant frequency fr2 is low enough to be ignored compared with an impedance ω2·L1 of the first coil L1 at the second resonant frequency fr2. Thus, the first coil L1 and the first capacitor C1 of FIG. 1 have an equivalent inductive characteristic L1 as illustrated in FIG. 4.

Also, when the power having the second resonant frequency fr2 is received wirelessly, a combined impedance of the second coil L2 and the second capacitor C2 has a very low value (ideally, 0), and thus, the impedance of the first coil L1 has a relatively high value compared to the combined impedance of the second coil L2 and the second capacitor C2. Thus, the first coil L1 connected in parallel with the second coil L2 and the second capacitor C2 may be considered to be an open circuit, so that first coil L1 does not affect the resonant circuit of the second coil L2 and the second capacitor C2.

Thus, when the power having the second resonant frequency fr2 is received wirelessly, the receiver 10 of the wireless power reception device 100 may be considered to be configured to include only the second coil L2 and the second capacitor C2, and so that the receiver 10 is able to receive the power having the second resonant frequency fr2 wirelessly through a resonance operation.

In FIGS. 3 and 4, the wireless power reception device 100 wirelessly receiving the power having the first resonant frequency fr1 or the second resonant frequency fr2 is illustrated by way of according to an exemplary embodiment may simultaneously receive the power having the first resonant frequency fr1 and the power having the second resonant frequency fr2 wirelessly. In this case, the power having the first resonant frequency fr1 is wirelessly received by the first coil L1 and the first capacitor C1 of the receiver 10, and the power having the second resonant frequency fr2 is wirelessly received by the second coil L2 and the second capacitor C2 of the receiver 10.

Figure 5:
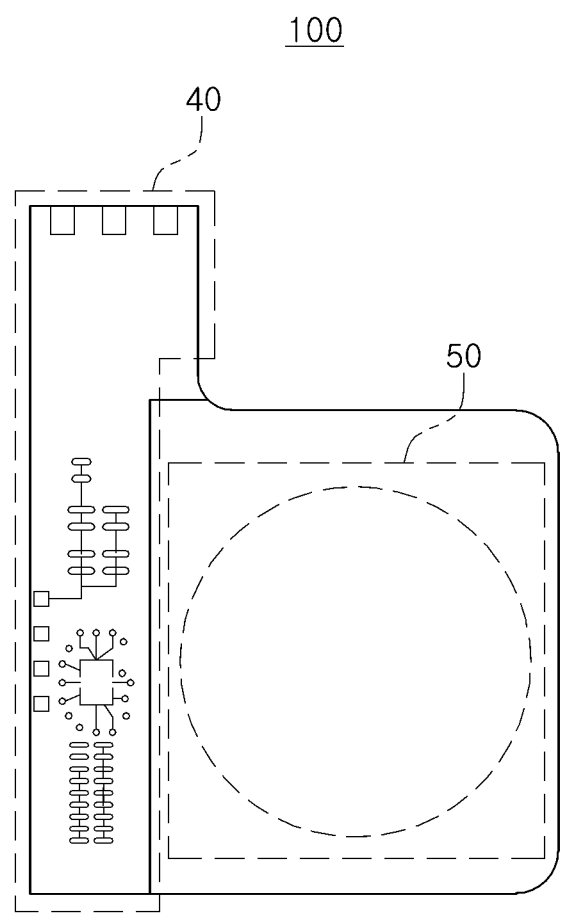
FIG. 5 illustrates an example of an actual implementation of a wireless power reception device.

FIG. 5 illustrates an example of an actual implementation of the wireless power reception device 100. The wireless power reception device 100 in this example includes a printed circuit board (PCB) including a first region 40 in which integrated circuits and electronic components are mounted, and a second region 50 in which coils are mounted.

In this example, the rectifier 20 (see FIG. 1) of the wireless power reception device 100 (see FIG. 1) is disposed in the first region 40. The rectifier 20 (see FIG. 1) may be implemented as a single chip.

The first coil L1 and the second coil L2 of the receiver 10 (see FIG. 1) of the wireless power reception device 100 (see FIG. 1) are disposed in the second region 50.

The first capacitor C1 and the second capacitor C2 of the receiver 10 (see FIG. 1) of the wireless power reception device 100 (see FIG. 1) may be disposed in the first region 40 or in the second region 50. In a case in which the first capacitor C1 and the second capacitor C2 are disposed in the second region 50, the first capacitor C1 and the second capacitor C2 may be embedded within the PCB.

Figure 6:
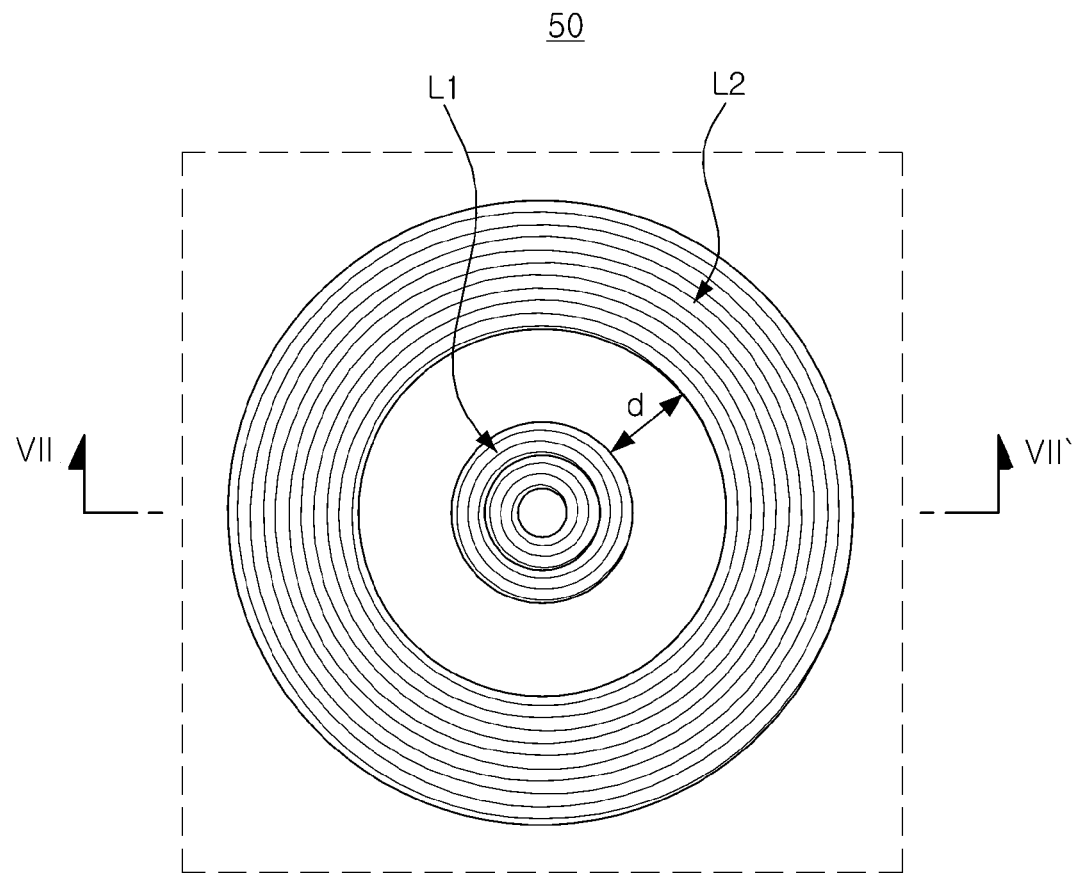
FIG. 6 illustrates an example of a coil provided in a second region of the wireless power reception device illustrated in FIG. 5.

FIG. 6 illustrates an example of a coil provided in the second region 50 of the wireless power reception device 100 illustrated in FIG. 5.

As illustrated in FIG. 6, the first coil L1 is disposed inside of and spaced apart from the second coil L2, which is disposed on the same surface of the PCB as the first coil L1, by a distance d. In the example in FIG. 6, the first coil L1 is disposed on the inner side of an inner periphery of the second coil L2, and the second coil L2 is disposed on an outer side of an outer periphery of the first coil L1, but the positions of the first coil L1 and the second coil L2 may be modified.

Also, in the example in FIG. 6, the first coil L1 and the second coil L2 have a circular shape, but the first coil L1 and the second coil L2 may have other shapes.

Figure 7:
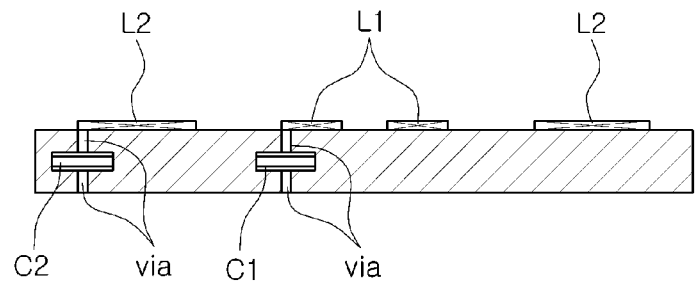
FIG. 7 illustrates an example of a cross-sectional view of the second region of the wireless power reception device illustrated in FIGS. 5 and 6 illustrating an example of capacitors provided in the second region of the wireless power reception device.

FIG. 7 illustrates an example of a cross-sectional view of the second region 50 of the wireless power reception device 100 illustrated in FIGS. 5 and 6 illustrating an example of capacitors provided in the second region 50 of the wireless power reception device 100.

In the example in FIG. 7, the first capacitor C1 and the second capacitor C2 are disposed in the second region 50, and are embedded within the PCB. The embedded first capacitor C1 is connected between the first coil L1 and the rectifier 20 (see FIG. 1) through a corresponding via hole, and the embedded second capacitor C2 is connected between the second coil L2 and the rectifier 20 (see FIG. 1) through a corresponding via hole. However, as long as the first capacitor C1 is connected to the first coil L1 in series and the second capacitor C2 is connected to the second coil L2 in series, the positions of the first capacitor C1 and the second capacitor C2 are limited to the positions illustrated in FIG. 7.

Alternatively, the first capacitor C1 and the second capacitor C2 may be disposed in the first region 40 rather than in the second region 50.

Figure 8:
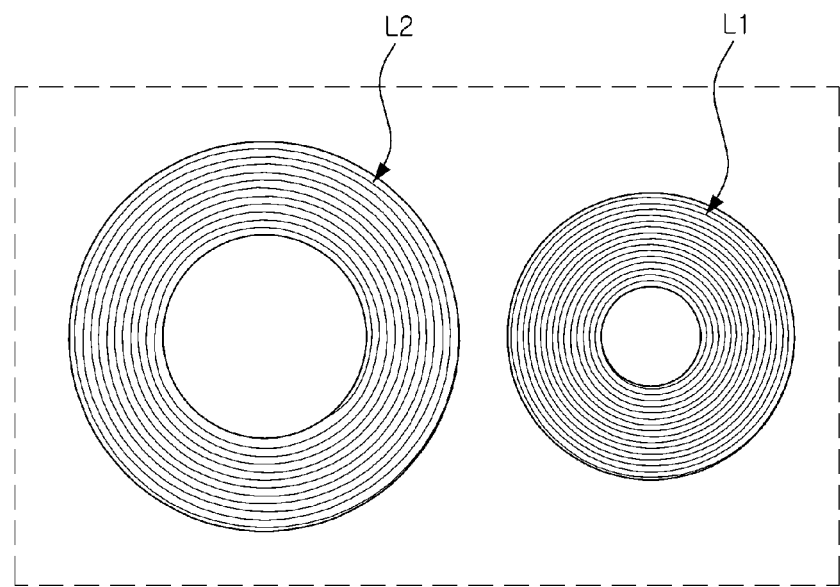
FIG. 8 illustrates another example of coils provided in the second region of the wireless power reception device illustrated in FIG. 5.
Figure 9:
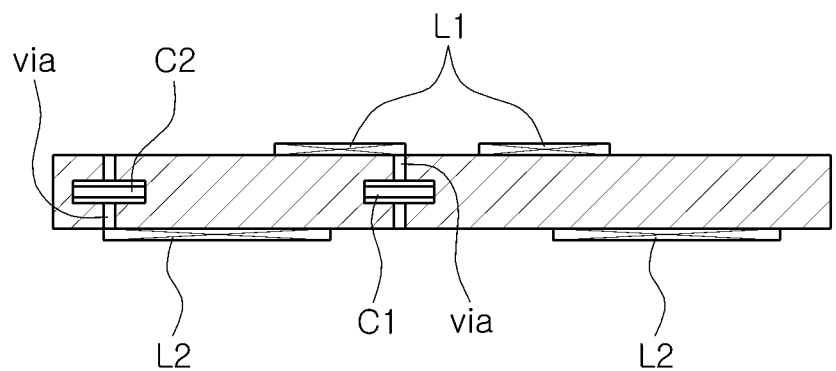
FIG. 9 illustrates another example of coils provided in the second region of the wireless power reception device illustrated in FIG. 5.

FIGS. 8 and 9 illustrate other examples of coils provided in the second region 50 of the wireless power reception device 100 illustrated in FIG. 5.

In the example in FIG. 8, the first coil L1 and the second coil L2 are disposed to be horizontally parallel on the same surface of the PCB.

Alternatively, in the example in FIG. 9, the first coil L1 and the second coil L2 are disposed on different surfaces of the PCB, for example, on one surface and the other surface of the PCB.

The first capacitor C1 and the second capacitor C2 may be disposed in the first region 40 or the second region 50, and in the case in which the first capacitor C1 and the second capacitor C2 are disposed in the second region 50, the first capacitor C1 and the second capacitor C2 may be embedded within the PCB as illustrated in FIGS. 7 and 9.

Figure 10:
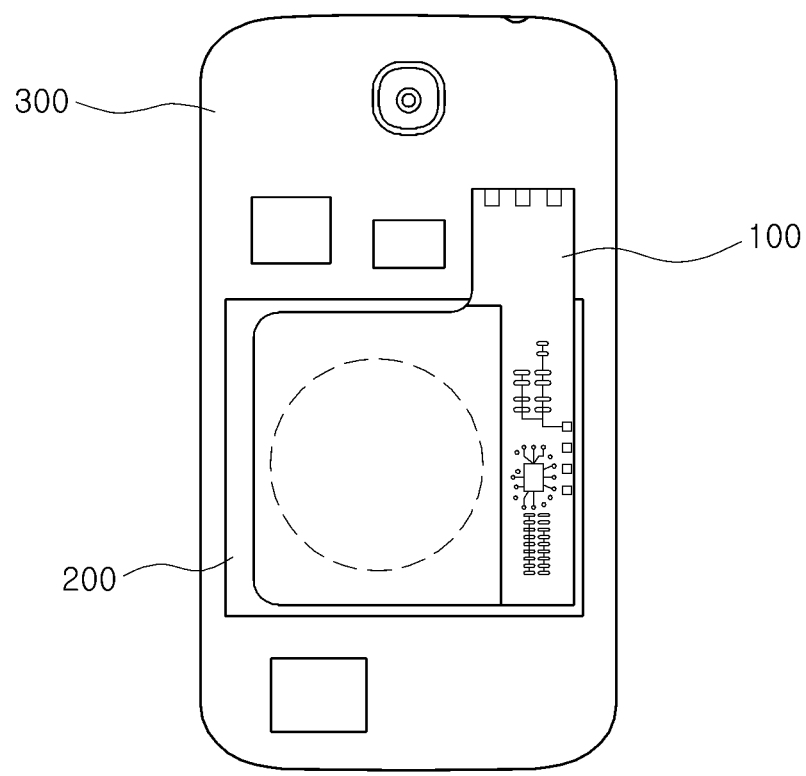
FIG. 10 illustrates an example of an electronic device in which a wireless power reception device is installed.

FIG. 10 illustrates an electronic device 300 in which the wireless power reception device 100 is installed. In FIG. 10, reference numeral 200 denotes a battery.

As illustrated in FIG. 10, the wireless power reception device 100 is installed on the rear side of the electronic device 300. The wireless power reception device 100 is disposed in a position in which a terminal of the wireless power reception device 100 and a terminal of the electronic device 300 are connected to each other so that power received wirelessly by the wireless power reception device 100 is supplied to the battery 200.

In FIG. 10, the wireless power reception device 100 installed on the rear side of the electronic device 300 is illustrated by way of example, but the wireless power reception device 100 may be installed in or connected to the electronic device 300 in various ways. For example, the electronic device 300 may have an extra port (e.g., a USB port or other port capable of receiving power), and the wireless power reception device 100 may be connected to the port.

In addition, the wireless power reception device 100, may be integrally formed with the battery 200, or may be integrally formed with the electronic device 300.

The wireless power reception device 100 including two coils and two capacitors has been described above as an example, but the number of coils and capacitors may be three or more to enable the wireless power reception device 100 to wirelessly receive three or more types of power having three or more different resonant frequencies through three or more different respective resonance operations.

In the examples of the wireless power reception device 100 described above, a series-connected circuit of a coil and a capacitor having a resonant frequency equal to a frequency of power being wirelessly transmitted is automatically activated among a plurality of series-connected circuits of coils and capacitor without the need of switches for selecting one of the plurality of series-connected circuits of coils and capacitors, and the power wirelessly received by the activated series-connected circuit of the coil and the capacitor is supplied to a rectifier.

The examples of the wireless power reception device and the electronic device described above enable remote wireless charging at various resonant frequencies. For example, by using the wireless power reception device capable of wirelessly receiving power having various resonant frequencies from various transmitters, flexibility in the use of the wireless power reception device may be secured. Also, since the wireless power reception device includes only coils and capacitors without switches to select the coils and capacitors, the circuit configuration of the wireless power reception device may be simplified.

While this disclosure includes specific examples, it will be apparent to one of ordinary skill in the art that various changes in form and details may be made in these examples without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power reception device comprising:
   a first resonant circuit having a first resonant frequency and configured to supply a first power to a rectifier; and
   a second resonant circuit connected in parallel with the first resonant circuit, having a second resonant frequency, and configured to supply a second power to the rectifier,
   wherein the rectifier is configured to rectify either one or both of the first power and the second power to output a charging current, and
   wherein the second resonant frequency is greater than or equal to five times the first resonant frequency.

2. The wireless power reception device of claim 1, wherein the first resonant circuit and the second resonant circuit are directly connected to each other.

3. The wireless power reception device of claim 1, wherein the first resonant circuit and the second resonant circuit are connected to each other without a switch.

4. The wireless power reception device of claim 1, wherein the first resonant circuit comprises:
   a first capacitor; and
   a first coil connected in series with the first capacitor.

5. The wireless power reception device of claim 1, wherein the second resonant circuit comprises:
   a second capacitor; and
   a second coil connected in series with the second capacitor.

6. The wireless power reception device of claim 1, wherein the first resonant frequency is a Wireless Power Consortium (WPC) standard frequency or a Power Matters Alliance (PMA) standard frequency, and
   the second resonant frequency is an Alliance for Wireless Power (A4WP) standard frequency.

7. A wireless power reception device comprising:
   a first resonant circuit having a first resonant frequency;
   a second resonant circuit connected in parallel with the first resonant circuit and having a second resonant frequency; and a rectifier configured to rectify power received wirelessly by either one or both of the first resonant circuit and the second resonant circuit to output a charging current, wherein the power is received wirelessly by the first resonant circuit and supplied to the rectifier in response to a frequency of the power being the first resonant frequency due to the second resonant circuit having a high impedance at the first resonant frequency relative to an impedance of the first resonant circuit at the first resonant frequency, the power is received wirelessly by the second resonant circuit and supplied to the rectifier in response to the frequency of the power being the second resonant frequency due to the first resonant circuit having a high impedance at the second resonant frequency relative to an impedance of the second resonant circuit at the second resonant frequency, and the second resonant frequency is greater than or equal to five times the first resonant frequency.

8. A wireless power reception device comprising a printed circuit board (PCB), the PCB comprising:

a first region in which a rectifier is disposed; and a second region having a first coil and a first capacitor that have a first resonant frequency, and a second coil and a second capacitor that have a second resonant frequency;

wherein one end of the first coil is connected to the rectifier and another end of the first coil is connected to the first capacitor, one end of the first capacitor is connected to the first coil and another end of the first capacitor is connected to the rectifier, one end of the second coil is connected to the rectifier and another end of the second coil is connected to the second capacitor, one end of the second capacitor is connected to the second coil and another end of the second capacitor is connected to the rectifier, the first coil and the first capacitor connected to each other are connected in parallel with the second coil and the second capacitor connected to each other, and the second resonant frequency is greater than or equal to five times the first resonant frequency.

9. The wireless power reception device of claim 8, wherein the first capacitor and the second capacitor are embedded in the second region of the PCB.

10. The wireless power reception device of claim 8, wherein the first coil and the second coil are disposed on a same surface of the second region of the PCB.

11. The wireless power reception device of claim 10, wherein the first coil is disposed inside an inner periphery of the second coil.

12. The wireless power reception device of claim 10, wherein the second coil is disposed outside the first coil.

13. The wireless power reception device of claim 8, wherein the first coil is disposed on one surface of the second region of the PCB, and the second coil is disposed on another surface of the second region of the PCB.

14. The wireless power reception device of claim 8, wherein the first resonant frequency is a Wireless Power Consortium (WPC) standard frequency or a Power Matters Alliance (PMA) standard frequency, and the second resonant frequency is an Alliance for Wireless Power (A4WP) standard frequency.

15. A wireless power reception device comprising a printed circuit board (PCB), the PCB comprising:

a first region in which a first capacitor, a second capacitor, and a rectifier are disposed; and a second region in which a first coil and a second coil are disposed;

wherein one end of the first coil is connected to the rectifier and another end of the first coil is connected to the first capacitor, one end of the first capacitor is connected to the first coil and another end of the first capacitor is connected to the rectifier, one end of the second coil is connected to the rectifier and another end of the second coil is connected to the second capacitor, one end of the second capacitor is connected to the second coil and another end of the second capacitor is connected to the rectifier, the first coil and the first capacitor are connected to each other are connected in parallel with the second coil and the second capacitor connected to each other, a resonant frequency of the first coil and the first capacitor is a first resonant frequency and a resonant frequency of the second coil and the second capacitor is a second resonant frequency, and the second resonant frequency is greater than or equal to five times the first resonant frequency.

16. The wireless power reception device of claim 15, wherein the first coil and the second coil are disposed on a same surface of the PCB.

17. The wireless power reception device of claim 15, wherein the first coil is disposed on one surface of the PCB, and the second coil is disposed on another surface of the PCB.

18. The wireless power reception device of claim 15, wherein the first resonant frequency is a Wireless Power Consortium (WPC) standard frequency or a Power Matters Alliance (PMA) standard frequency, and the second resonant frequency is an Alliance for Wireless Power (A4WP) standard frequency.

19. An electronic device comprising:

a first resonant circuit having a first resonant frequency and configured to supply a first power to a rectifier; and a second resonant circuit connected in parallel with the first resonant circuit, having a second resonant frequency, and configured to supply a second power to the rectifier; and a battery configured to receive the charging current to be charged by the charging current, wherein the rectifier is configured to rectify either one or both of the first power and the second power to output a charging current, and the second resonant frequency is greater than or equal to five times the first resonant frequency.

20. The electronic device of claim 19, wherein the first resonant circuit comprises:

a first capacitor; and a first coil connected in series with the first capacitor.

21. The electronic device of claim 19, wherein the second resonant circuit comprises:

a second capacitor; and a second coil connected in series with the second capacitor.

22. The electronic device of claim 19, wherein the first resonant frequency is a Wireless Power Consortium (WPC) standard frequency or a Power Matters Alliance (PMA) standard frequency, and the second resonant frequency is an Alliance for Wireless Power (A4WP) standard frequency.

23. A wireless power reception device comprising:
a receiver comprising a plurality of resonant circuits, each having a different resonant frequency and configured to transmit power to a rectifier, the receiver being configured to:
  activate, without using a switch, one of the resonant circuits having a resonant frequency equal to a frequency of a power being wirelessly transmitted, and
  receive the power being wirelessly transmitted,
wherein the rectifier is configured to rectify the power received by the receiver to output a charging current, and
wherein the resonant frequency of one of the plurality of resonant circuits is greater than or equal to five times the resonant frequency of another of the plurality of resonant circuits.

24. The wireless power reception device of claim 23, wherein each of the plurality of resonant circuits comprises a coil and a capacitor connected in series with each other.

25. The wireless power reception device of claim 23, wherein the resonant circuits are directly connected in parallel with each other without being connected through any switch.

26. The wireless power reception device of claim 23, wherein each of the plurality of resonant circuits except the resonant circuit having the resonant frequency equal to the frequency of the power being wirelessly transmitted has an impedance at the resonant frequency of the power being wirelessly transmitted that is sufficiently high that essentially none of the power being wirelessly transmitted is received by any of the resonant circuits except the resonant circuit having the resonant frequency equal to the frequency of the power being wirelessly transmitted.

* * * * *